US011891850B2

(12) United States Patent
Terno

(10) Patent No.: US 11,891,850 B2
(45) Date of Patent: Feb. 6, 2024

(54) DEVICE FOR THE SLIDING MOVEMENT OF DOORS AND WARDROBE DOORS

(71) Applicant: TERNO SCORREVOLI S.P.A. UNIPERSONALE, Varedo (IT)

(72) Inventor: Giovanni Terno, Vared (IT)

(73) Assignee: TERNO SCORREVOLI S.P.A. UNIPERSONALE, Varedo (IT)

( * ) Notice: Subject to any disclaimer, the term of this patent is extended or adjusted under 35 U.S.C. 154(b) by 746 days.

(21) Appl. No.: 16/986,545

(22) PCT Filed: Feb. 8, 2019

(86) PCT No.: PCT/EP2019/000037

§ 371 (c)(1),
(2) Date: Aug. 6, 2020

(87) PCT Pub. No.: WO2019/158265

PCT Pub. Date: Aug. 22, 2019

(65) Prior Publication Data

US 2021/0017800 A1 Jan. 21, 2021

(30) Foreign Application Priority Data

Feb. 13, 2018 (IT) ........................ 102018000002616
Oct. 11, 2018 (IT) ........................ 102018000009360

(51) Int. Cl.
*E05F 5/10* (2006.01)
*E05F 5/00* (2017.01)

(52) U.S. Cl.
CPC ......... *E05F 5/003* (2013.01); *E05Y 2201/456* (2013.01); *E05Y 2201/624* (2013.01);
(Continued)

(58) Field of Classification Search
CPC ..... E05F 3/00; E05F 3/003; E05F 3/02; E05F 3/06; E05F 3/08; E05F 3/10; E05F 3/14;
(Continued)

(56) References Cited

U.S. PATENT DOCUMENTS 897,747 A * 9/1908 Joyce .................. E05D 15/0652
16/86 A
6,438,795 B1 * 8/2002 Haab ......................... E05F 5/00
16/86 B (Continued)

FOREIGN PATENT DOCUMENTS

DE 202008014529 U1 3/2010
DE 202008014529 U1 * 4/2010 ............. E05D 15/08

(Continued)

OTHER PUBLICATIONS

International Preliminary Report on Patentability received for the International Application No. PCT/EP2019/000037, dated Aug. 18, 2020, 8 pages.

*Primary Examiner* — Chuck Y Mah
(74) *Attorney, Agent, or Firm* — Amster, Rothstein & Ebenstein LLP

(57) ABSTRACT

A movement device for the sliding movement of furniture and wardrobe doors having inner and outer doors which slide along parallel tracks/guides. The movement device includes inner and outer pairs of carriages each having a roller. The carriages are fixed to the inner front of each door. A plate directly attaches each inner carriage to the inner door. A frame with an inverted "U" cross-section attaches each outer carriage to the outer door. Air pistons are fixed proximate the ends of the guides, along which the rollers of the carriages slide for the cushioned stop at the end stroke of moving the carriages when opening and closing the doors. The mounting device includes a support member housing a second piston which is surmounted by an elastic clamp. The (Continued)

Figures 6, 7, 8, 9, 10, 11:
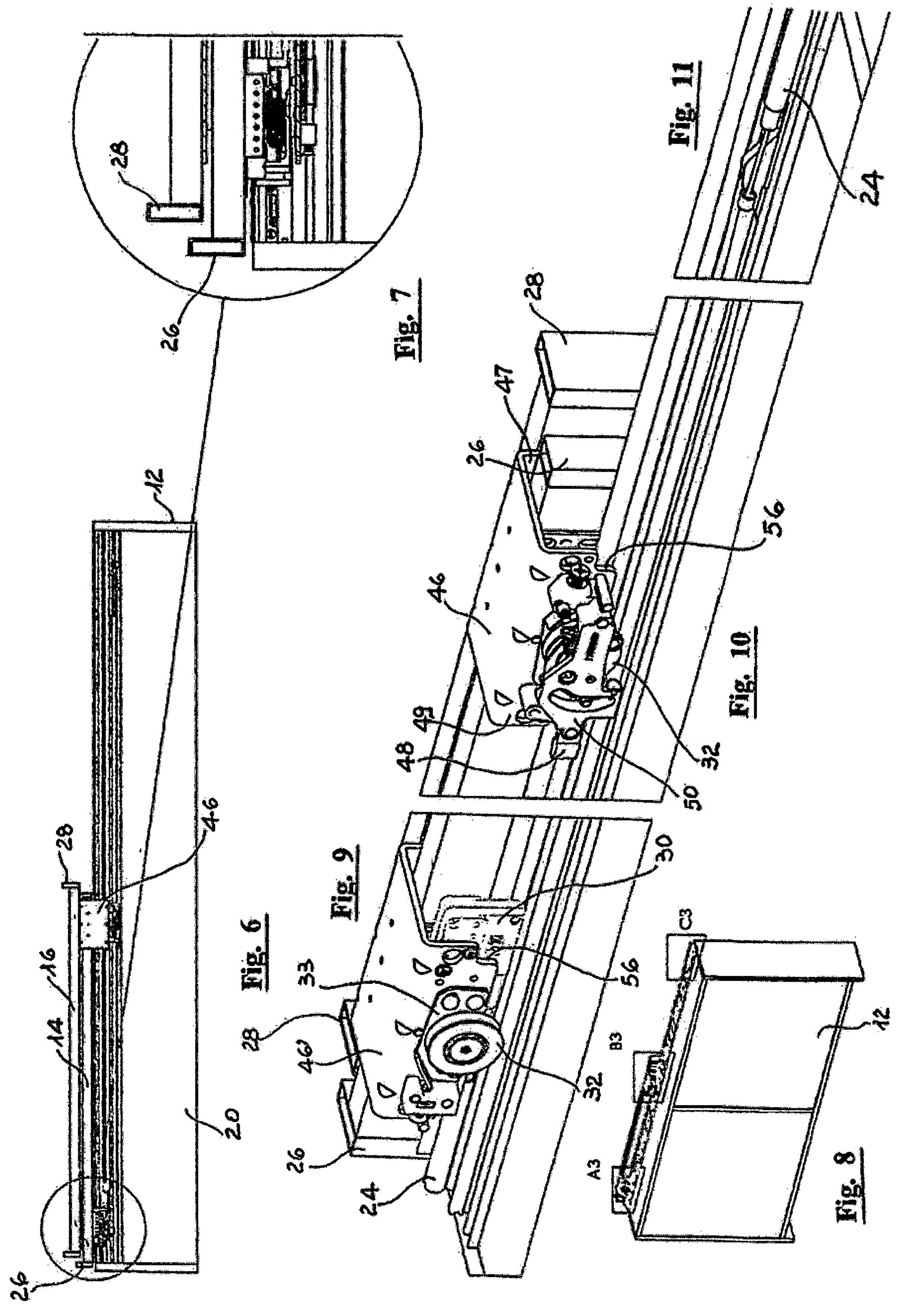

clamp selectively interfaces with an aligned wedge extending from a carriage from the other door to prevent abutment between door handles.

13 Claims, 9 Drawing Sheets

(52) U.S. Cl.
CPC ... *E05Y 2201/688* (2013.01); *E05Y 2201/708* (2013.01); *E05Y 2600/502* (2013.01); *E05Y 2600/51* (2013.01); *E05Y 2600/632* (2013.01); *E05Y 2800/276* (2013.01); *E05Y 2900/20* (2013.01)

(58) Field of Classification Search
CPC ....... E05F 3/16; E05F 3/18; E05F 3/20; E05F 3/102; E05F 5/00; E05F 5/003; E05F 5/02; E05F 5/06; E05F 5/006; E05F 5/08; E05F 5/10; E05F 5/022; E05Y 2900/54; E05Y 2900/548; E05Y 2201/21; E05Y 2201/254; E05Y 2201/256; E05Y 2201/264; E05Y 2201/266; E05Y 2201/412; E05Y 2201/46; E05Y 2201/47; E05Y 2201/474; E05Y 2201/456; E05Y 2201/624; E05Y 2201/688; E05Y 2201/708; E05Y 2800/276; E05Y 2600/45651; E05Y 2600/502; E05Y 2600/632; E05Y 2900/20
See application file for complete search history.

(56) References Cited

U.S. PATENT DOCUMENTS

| | | | | |
|---|---|---|---|---|
| 7,194,785 | B2 * | 3/2007 | Li | F16F 1/12 16/85 |
| 8,402,606 | B1 * | 3/2013 | Tsai | E05F 5/003 16/49 |
| 9,151,101 | B2 * | 10/2015 | Lowe | E05F 5/006 |
| 2002/0178668 | A1 * | 12/2002 | Haab | E05F 5/003 52/243.1 |
| 2017/0074018 | A1 * | 3/2017 | Bortoluzzi | E05F 5/02 |
| 2017/0096850 | A1 * | 4/2017 | Hopkins | E05F 5/02 |
| 2017/0204646 | A1 * | 7/2017 | Tomlinson | E05F 5/003 |
| 2017/0321464 | A1 * | 11/2017 | Bortoluzzi | E05F 5/027 |

FOREIGN PATENT DOCUMENTS

| | | | | | |
|---|---|---|---|---|---|
| DE | 102009011919 | A1 | | 9/2010 | |
| DE | 202016105495 | U1 | | 11/2016 | |
| EP | 2982818 | A1 | * | 2/2016 | E05D 13/04 |
| JP | 11148269 | A | * | 6/1999 | |
| JP | 2007291695 | A | * | 11/2007 | |
| JP | 2014206037 | A | * | 10/2014 | |
| KR | 468518 | Y1 | * | 8/2013 | |
| WO | WO2006114352 | A1 | * | 11/2006 | |
| WO | 2018019415 | A1 | | 2/2018 | |

* cited by examiner

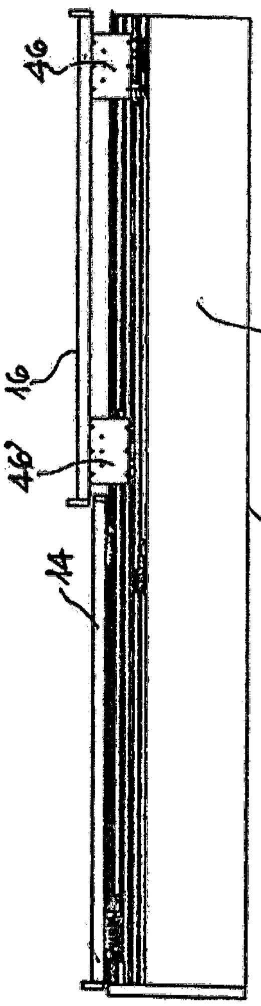
Fig. 2
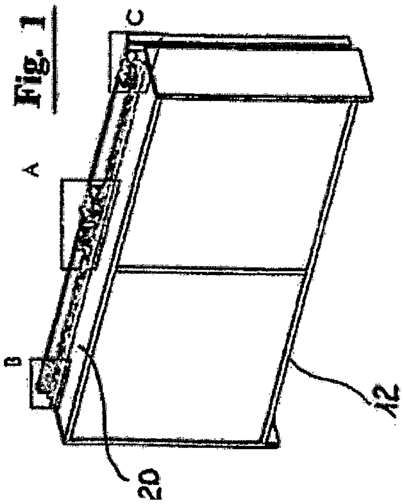
Fig. 1
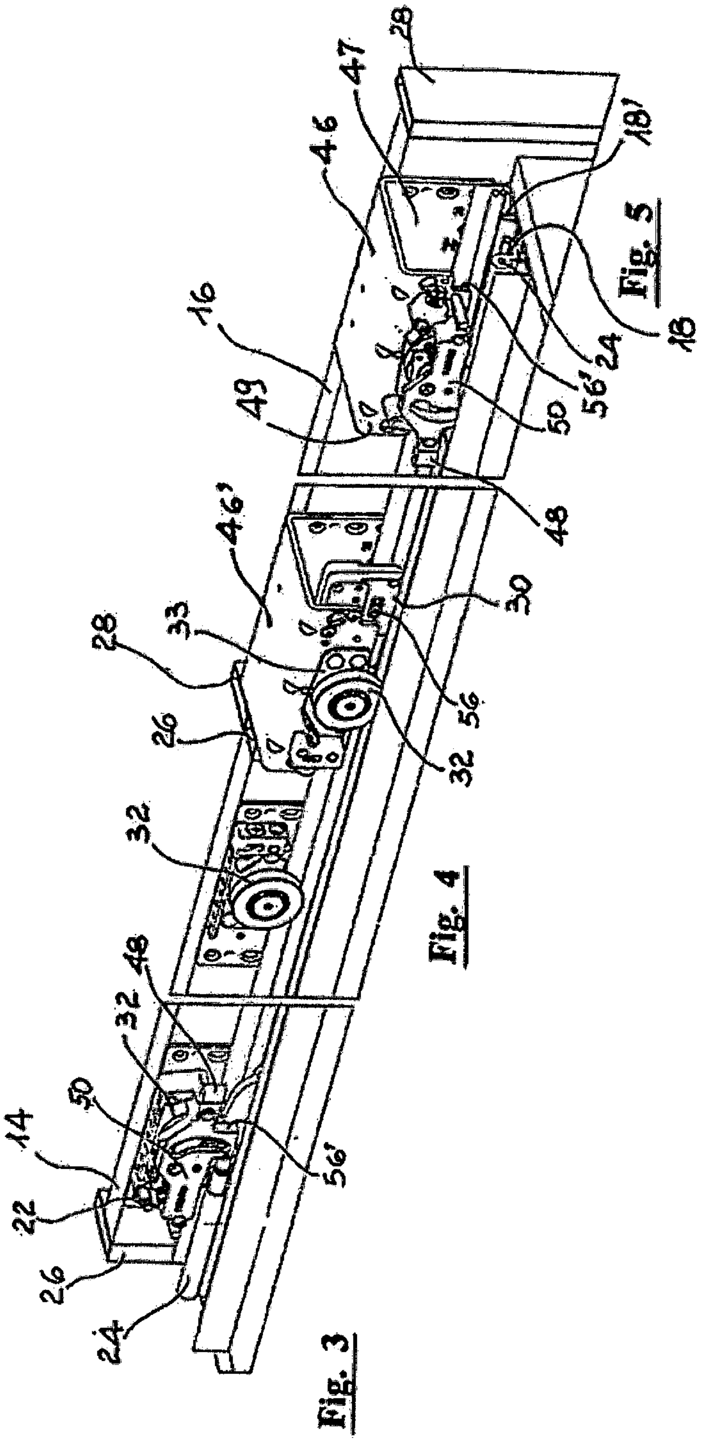
Fig. 5
Fig. 4
Fig. 3

A2
B2
C2

Fig. 28
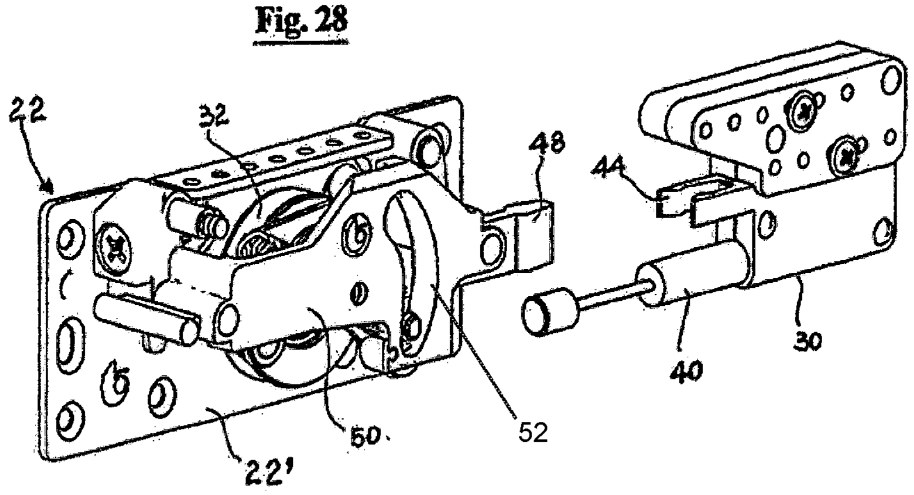
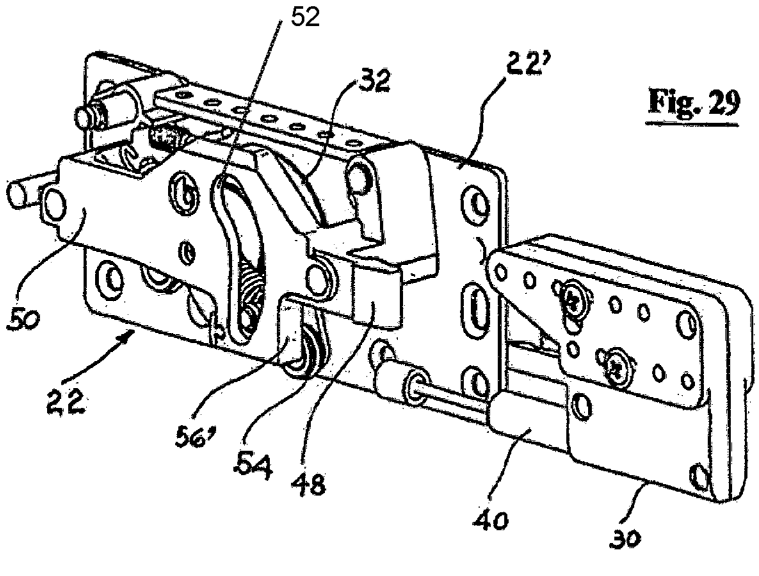
Fig. 29

DEVICE FOR THE SLIDING MOVEMENT OF DOORS AND WARDROBE DOORS

CROSS REFERENCE TO RELATED APPLICATION

This application claims benefit under 35 U.S.C. § 371 to international application No. PCT/EP2019/000037 filed on Feb. 8, 2019, which claims priority to Italian application Nos, 102018000002616 filed Feb. 13, 2018 and 102018000009360 filed Oct. 11, 2018, the contents of which are incorporated by reference in their entireties.

The present invention relates to a device for the sliding movement of doors and wardrobe doors.

More particularly, the present invention relates to a device as defined above, especially suitable for integrating into an apparatus by means of which the sliding of furniture or wardrobe doors and the precise opening and closing position of said doors is achieved. The device according to the invention is suitable to perform a dual function, in the sense that it prevents the handles or grips for moving the individual doors from coming into contact with each other, with the risk of damage, while also preventing the user's fingers from being crushed between them when opening or closing one or more of said doors. The device according to the invention is in fact suitable for use on furniture or wardrobes comprising two or more doors, sliding along guide rails placed on parallel lines.

According to an alternative embodiment, the progressive braking and coupling means provided for the sliding doors or wardrobe doors are advantageously used for the same purpose for sliding doors, installed to close the passageway between two adjacent spaces as needed.

As is known, a widespread type of wardrobes provides that the doors do not open cantilevered, rotate on hinges that support them on one side, but instead alternately open or close access to the respective compartments of the wardrobe itself by sliding frontally, thanks to upper and lower carriages that move along paired guide rails; the upper guide rails are fixed near the front edge of the upper closing panel, or top, of said wardrobes. In this case, the doors are led to slide in overlap when one of them is opened and this is made possible by the fact that the guide rails of the carriages are independent, close and parallel to each other. It follows that the wardrobe, if fitted with only two doors, identifies an outer door and an inner door, both of which can be fully or only partially opened, independently of each other. To make movement possible when opening and closing, said outer and inner doors are provided with respective handles or grips, fixed on them so as to project at a convenient height at the edges defined by one or both opposite vertical sides.

Under ideal conditions of use, the handles of the respective doors cannot hit each other, since the inner door is moved in opening only when the outer door is completely closed, and vice versa. The door that reaches the end of stroke, in opening or closing, has a traditional stop element, which can be cushioned or of the pincer type; two stops are used for each door, one for the open position and one for the closed position. Such stops are typically fixed to the ends of the rails forming the sliding guides of the doors. Even in the case of a three-door wardrobe, the door to be opened should only be opened when the remaining two doors are completely closed. However, it frequently happens in both cases that one of the doors is moved when the other or the others are not completely closed, so that the respective handles can hit each other violently and be damaged; there is also the real risk that the user's fingers may be crushed between the handles when they collide. Given the sometimes significant weight of these doors, the risk that the user may suffer serious injury in this case is high.

In order to overcome these drawbacks, devices have been designed to limit the reciprocal stroke of the doors; these devices, consisting of an element that is typically fixed to the carriage to which the door is connected, prevent the handles from coming into contact with each other, but have the drawback of causing a considerable noise, in addition to that of not being aesthetically in line with the rest of the wardrobe.

The purpose of the present invention is to overcome the drawbacks complained of above.

More particularly, the object of the present invention is to provide a handle-saving device for wardrobes with sliding doors suitable to prevent the handles from coming into contact with each other.

A further object of the invention is to provide a device as defined above able to prevent contact between the handles even if one door of the wardrobe is opened when the other door is not completely closed.

A no less important purpose of the invention is to provide a handle-saving device for the sliding doors of wardrobes suitable to constitute at the same time an end stop to the stroke for the opening door.

A further purpose of the invention is to make available to users a handle-saving device suitable to ensure a high level of resistance and reliability over time, in addition such as to be easily and economically made.

These and other purposes are achieved by the handle-saving device for the sliding doors of wardrobes of the present invention according to the main claim.

Figures 12, 13, 14, 15, 16, 17, 18:
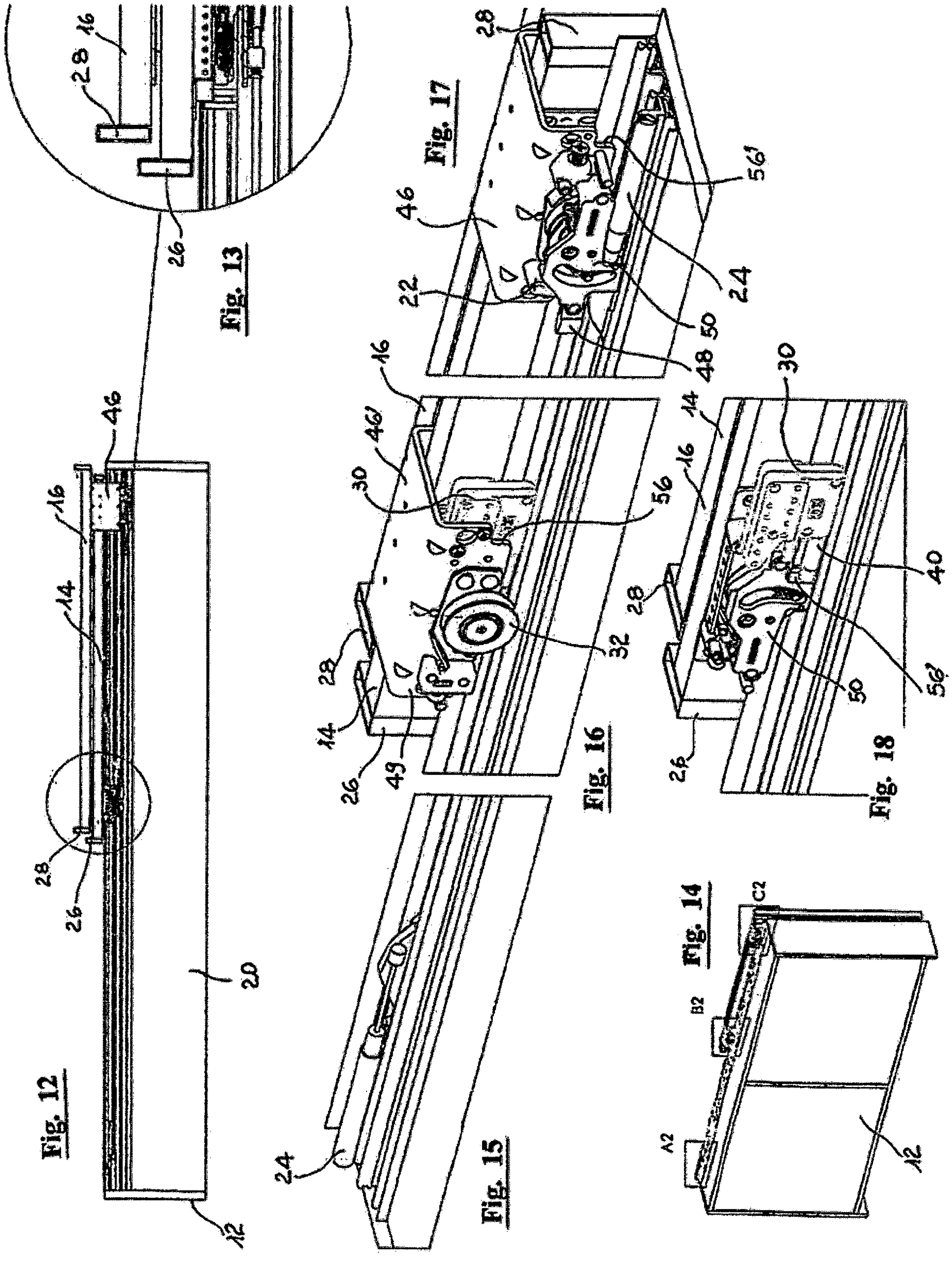
Figures 19, 20, 21, 22, 23, 24, 25:
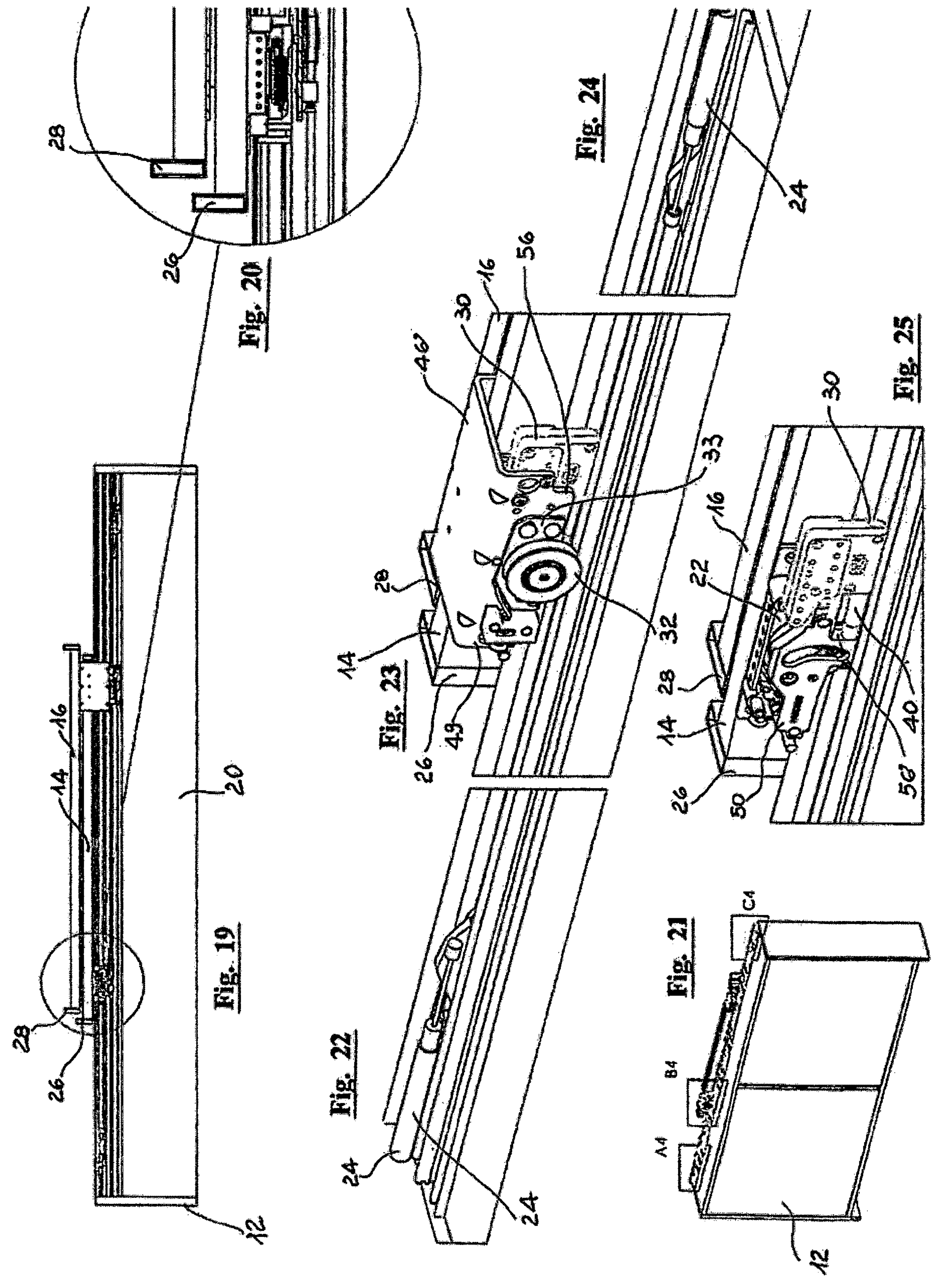
Figure 26:
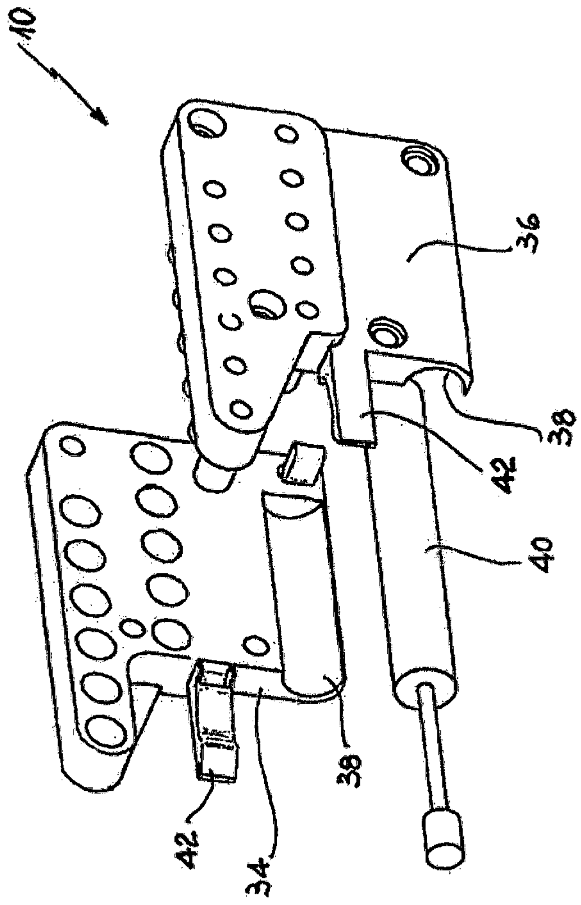
Figure 27:
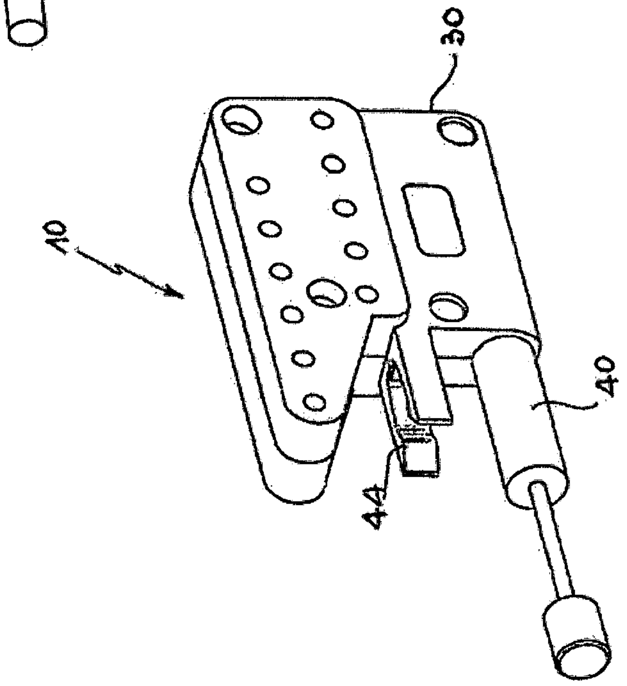
Figure 35:
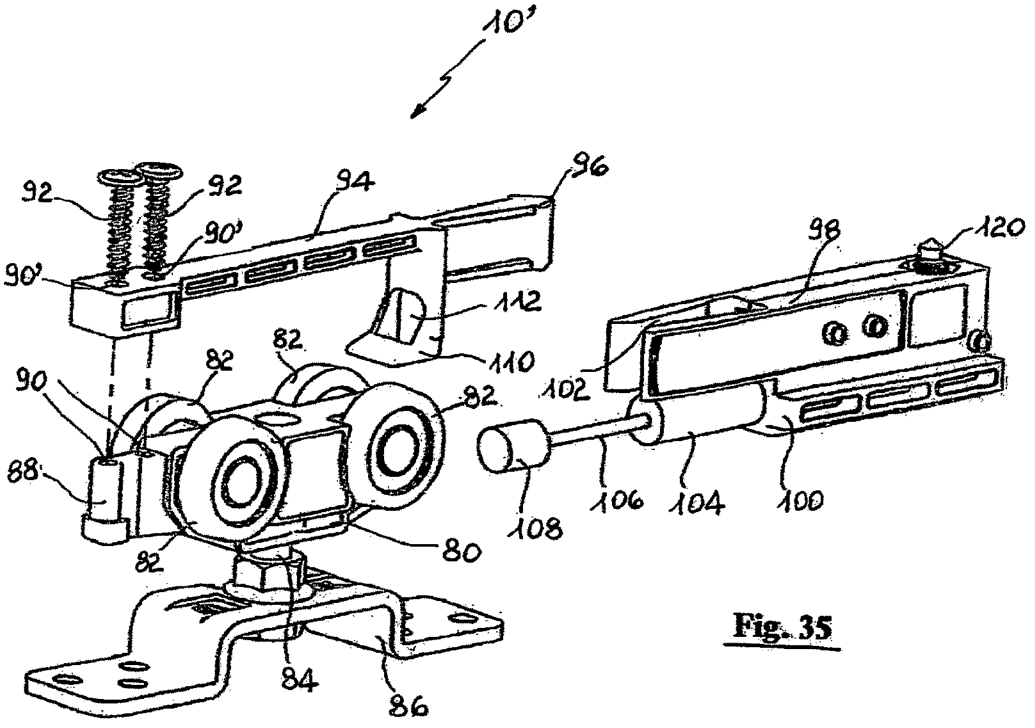
Figure 36:
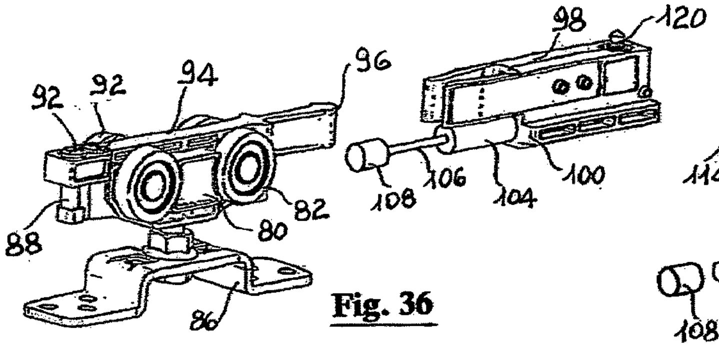
Figure 37:
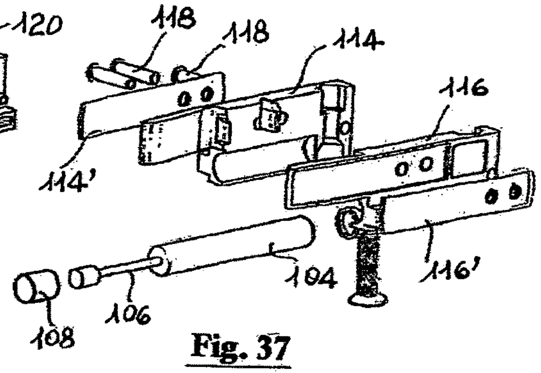
Figure 38:
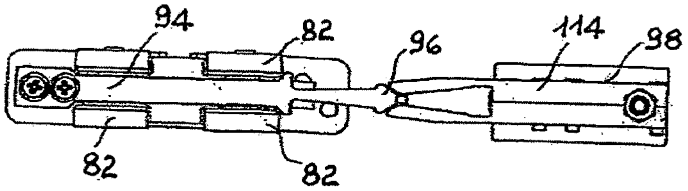

The construction and functional characteristics of the handle-saving device for the sliding doors of wardrobes of the present invention will be more clearly comprehensible from the detailed description below in which reference is made to the appended drawings which show a preferred and non-limiting embodiment and wherein:

FIG. 1 schematically represents, in axonometric view from the rear face, a wardrobe fitted by way of example with two sliding doors and the device of the present invention;

FIG. 2 schematically represents the same wardrobe in top view with both doors closed in a complete manner;

FIGS. 3, 4 and 5 represent respectively as many enlarged axonometric views of the details indicated as A, B and C in FIG. 1;

FIG. 6 schematically represents, in a view from above, the wardrobe in FIG. 1 in the condition in which the inner door is completely closed while the outer one is totally open with the intervention of the device of the invention;

FIG. 7 is an enlarged detail of FIG. 6, highlighting the position of the handles when the doors are arranged according to the illustration in the previous figure, depending on the intervention of said device;

FIG. 8 schematically represents the axonometric view from the rear face of the wardrobe with the doors arranged according to the representation in FIG. 6;

FIGS. 9, 10 and 11 represent respectively as many enlarged axonometric views of the details indicated as A3, B3 and C3 in FIG. 8;

FIG. 12 schematically represents a view from above of the wardrobe in which the inner door is in the open position and the outer one is in the closed position;

FIG. 13 is an enlarged detail of FIG. 12, to highlight the position that the handles assume when the doors are arranged according to the illustration in the previous figure, as a result of the intervention of the device of the invention;

FIG. 14 schematically represents the axonometric view from the rear face of the wardrobe with the doors arranged according to the representation in FIG. 12;

FIGS. 15, 16 and 17 respectively represent as many enlarged axonometric views of the details indicated as A2, B2 and C2 in FIG. 14;

FIG. 18 schematically represents the same detailed view as FIG. 16, but lacks the element bearing the wheel to better highlight the device of the invention;

FIG. 19 schematically represents the view from above of the wardrobe in which both the inner and outer doors are in the possible partially open position;

FIG. 20 is an enlarged detail of FIG. 19, to highlight the position that the handles assume when the doors are arranged according to the illustration in the previous figure, as a result of the intervention of the device of the invention;

FIG. 21 schematically represents the axonometric view from the rear face of the wardrobe, with the doors arranged according to the representation in FIG. 19;

FIGS. 22, 23 and 24 represent respectively as many enlarged axonometric views of the details indicated as A4, B4 and C4 in FIG. 21;

FIG. 25 schematically represents the same detailed view as FIG. 23, but lacks the element bearing the wheel to better highlight the device of the invention;

FIG. 26 schematically represents the handle-saving device of the invention in exploded view;

FIG. 27 illustrates an axonometric view of the same device, assembled;

FIGS. 28 and 29 schematically illustrate, in axonometric view and in different positions, the handle-saving device of the invention approaching one of the carriages which the doors of the wardrobe are provided with, to highlight the stop clamp and the piston associated with it;

FIGS. 30 to 34 schematically illustrate the solution wherein the handle-saving device of the present invention is applied, by way of example, to a wardrobe with three doors;

FIG. 35 schematically represents, in exploded view, an alternative embodiment of the device of the invention, wherein the progressive braking and coupling means provided for the sliding doors of the furniture or wardrobes are combined with a conventional carriage suitable to support a sliding door;

FIG. 36 schematically represents an axonometric view of the device in FIG. 35 with its components assembled;

FIG. 37 schematically represents, in an exploded view, the same device with the clamp and piston associated therewith;

FIG. 38 schematically represents, in a view from above, the device in FIG. 36.

With initial reference to FIGS. 1 to 5 and 10, the handle-saving device of the present invention, globally denoted by reference numeral 10 in FIGS. 26, 27 and 28, is associated with a wardrobe 12 illustrated by way of example in FIGS. 1 and 2; the wardrobe 12 is by way of example provided with two sliding doors, inner 14 and outer 16, typically quadrangular in shape, moved along respective guides consisting of two paired shaped profiles 18 and 18', in themselves known. Said guides are fixed to the top or upper base 20 of said wardrobe, near the front edge thereof; on them the wheels or rollers 32 of the known carriages 22 slide, shown schematically in detail in FIGS. 28 and 29 in the embodiment comprising a shaped body 50 more of which will be said below. The carriages 22 preferably comprise a plate-shaped member 22' for their direct attachment to the inner doors 14. As for the outer doors 16, the carriage 22 is advantageously composed of a roller 32 combined with a plate 33, as illustrated for example in FIGS. 4 and 9. The plate 33 is connected with rivets or similar to a frame having an inverted "U" cross-section 46 or 46'; each of the frames 46, 46' defines, as may be seen for example in FIGS. 5 and 10, two parallel vertical walls 47 and 49, the first of which is preferably higher and forms the attachment surface to the inner face of the outer doors 16, at their upper edge. The inverted U-section frames 46, 46' are fixed to the opposite ends of the upper side of the outer door 16. For easier identification, reference numeral 46 indicates the frame located at the rear end of the outer door 16, the carriage of which is designed to cooperate with the end-stroke stop; 46' indicates the other frame, which is instead arranged at the opposite front end of the same outer door 16. The aforementioned frames are high enough to pass over the inner door 14, as illustrated for example in FIG. 10. The carriage 22 formed by the roller 32 combined with the plate 33 is fixed to the exposed face of the wall 49 of the aforementioned frame 46, so that said roller rests on one of the shaped profiles 18, 18'; in particular, the roller 32 connected to the frame 46 slides on the inner guide 18, which is positioned innermost on the top 20 of the wardrobe 12, while the other guide 18' or outer guide is closer to the doors 14, 16 and on it the rollers 32 of the carriages 22 fixed to the inner door 14 slide. This arrangement can be seen for example in FIGS. 4 and 5. Each of the inner and outer doors 14 and 16 is provided with two carriages as defined above, constrained in a position close to the opposite ends of the upper side of said doors. From FIG. 2, in particular, it can be seen that on the exposed front face of the wardrobe 12 the inner door 14, i.e. closer to the body of said wardrobe, and the outer door 16, cantilevered outwards with respect to the former, are arranged. When opening a half-part of the wardrobe 12, the outer door 16 is positioned so as to surmount the inner door 14, or the latter is positioned below the outer one, as respectively schematically shown in FIGS. 6 and 12. At the ends of the shaped guide profiles 18 along which the wheels or rollers 32 of the conventional carriages 22 slide, devices in themselves known are fixed for the cushioned stop at the end-stroke upon closing and opening said doors; said devices, driven by contact with abutments 56, 56' respectively made on the frames 46 and 46' as well as on the shaped bodies 50, typically consist of air pistons 24 or equivalent means of a known type, shown for example in FIGS. 3 and 9 relative to the inner door 14 and FIGS. 11 and 17 relative to the outer door. The air pistons 24 ensure a cushioned and progressive braking, preventing the doors 14 and 16 from reaching their natural end stroke violently, with the risk of damage or even causing unwanted displacements of the carriages 22; the abutment of the frame 46' that drives the air pistons 24 is indicated by reference numeral 56 for example in FIGS. 10 and 16.

Both the inner and outer doors 14 and 16 are provided with gripping handles for their opening and closing movement; in the embodiment shown in the figures, the handles consist of strips or mouldings with a straight extension, which protrude cantilevered outwards and extend vertically at the opposite edges of said doors; the strips or mouldings are indicated by reference numeral 26 as regards the inner door 14 and by 28 for the outer door 16 and, preferably, extend for the entire height of said doors. The cushioned stop devices such as air pistons 24 prevent the doors from violently abutting the respective end stop upon closing and opening, but do not exclude the danger that the gripping handles of said doors, consisting of strips or mouldings 26 and 28, may collide with each other, or come into close contact with each other with the risk of crushing the user's fingers, under certain conditions. The device 10 of the present invention makes it possible to prevent such drawbacks. Said device, illustrated in detail in FIGS. 26 and 27, as well as FIGS. 28 and 29 in conjunction with a carriage 22, comprises a shaped support 30, made of plastic or metal, designed to be fixed to the carriage 22 of the outer door 16, as specified in detail below. The support 30 is formed of two complementary semi-shells 34, 36, as seen in FIG. 26, each of which comprises underneath a semi-circular profile recess 38 extending horizontally to form the positioning and stabilization seat of a piston 40, for example similar to the air pistons 24 fixed to the ends of the guide profiles 18. Above the recess 38 from the semi-shells 34, 36 a shaped appendage 42 protrudes which forms, once said semi-shells are coupled together with screws or equivalent means, the elastic pincer or clamp 44 in FIG. 27. The shaped support 30 thus formed is connected with generic screws to the frame with inverted "U" section 46', in particular to the inner face of its vertical wall 49 bearing the roller 32, as can be seen in particular in FIGS. 4, 9, 16 and 18. The elastic clamp 44 borne by the shaped support 30 is designed to cooperate with a wedge-shaped appendage 48 of one of the carriages 22; in particular, said appendage 48 protrudes from a shaped body 50, fixed with generic screws or rivets to the plate-shaped element 22' of the carriage 22 borne by the frame 46 located at the rear end of the outer door 16 and is oriented in the direction of the frame 46' placed at the opposite front end of said outer door 16. The wedge shape facilitates the insertion of the appendage 48 into the elastic clamp 44, as specified below in relation to the operation of the handle-saving device of the present invention. The shaped body 50, which is an integral part of the device of the present invention, is combined with the carriage 22 fixed to the frame 46 on which the shaped support 30 as illustrated in FIGS. 5, 10 and 17 is absent; said shaped body 50, which covers part of the roller 32, can be fixed to the carriage 22 in two alternative positions, to arrange the wedge appendage 48 rightwards or leftwards as required. This can be seen, for example, from the comparison of FIGS. 3 and 5, in which the wedge appendage 48 of one carriage 22 faces the wedge appendage of the other carriage. The shaped body 50 comprises an arched through recess 52 (see e.g., FIGS. 28, 29) having the function of delimiting the stroke of a rocker arm relevant to a solution unrelated to the present invention and protected independently; the same applies to the wheel 54 which is illustratively visible in FIG. 29. The outer door 16 is provided with two inverted "U" frames 46, 46' by means of which it passes over the inner door 14 to bring the respective rollers 32 to abut against one of the guide profiles 18; the aforementioned frames are arranged near the opposite sides of the outer door 16, along the upper edge of the same and in a position close to the opposite mouldings 26. As specified, the shaped support 30, which bears the piston 40 and the overlying elastic clamp 44, is fixed to the inner face of the vertical wall 49 of the inverted U-section frame 46'.

The opening movement of the inner 14 and outer 16 doors takes place in the manner described below.

The initial situation is that shown in FIG. 2, wherein both the inner 14 and outer 16 doors are in the totally closed position and abut the respective end-stroke defined by the retracted stem of the air piston 24 (FIG. 2, as well as FIGS. 3 and 5 in particular).

When the outer door 16 is fully opened, while the inner door remains completely closed (FIGS. 6 to 10), there is contact between the piston stem 40, borne by the support 30 fixed to the frame 46 ', and the abutment 56' of the shaped body 50, the latter belonging to the carriage 22 already at the end stroke of the inner door 14; at the same time, the pincer 44 borne by the same support 30 couples with the wedge-shaped appendage 48 of said carriage, as may be inferred from the representations in FIGS. 28 and 29. In practice, the opening phase leads the outer door 16 to cushion its stroke on the inner door 14, while the engagement of the wedge-shaped appendage 48 in the pincer 44 determines the obligatory position between said doors which do not overlap completely, as shown in FIGS. 6 and 7; it follows that the respective mouldings or handles 26 and 28 remain adequately spaced apart, do not collide and do not cause crushing of the user's fingers.

Starting from the same condition in which both the inner 14 and outer 16 doors are in the totally closed position and abut the respective end stroke, consider now the phase leading to the opening of the inner door 14 (FIGS. 12 to 18). In this situation, the opposite occurs with respect to the above, i.e. it is the inner door 14 which is cushioned on the outer door 16. In fact, this movement leads the carriage 22 of the inner door 14 to bring the wedge-shaped appendage 48 which it is fitted with to engage with the pincer 44 of the support 30 fixed to the frame 46'. At the same time, by means of the abutment 56' placed on the shaped body 50, the carriage 22 pushes on the piston stem 40 of said support 30 and realizes the cushioning effect for the inner door 14 upon opening. As for the situation described above, the engagement of the wedge-shaped appendage 48 in the pincer 44 determines the position between said doors which do not overlap completely, as shown in FIGS. 12 and 13; it follows that the respective mouldings or handles 26 and 28 remain adequately spaced apart, therefore they do not collide and avoid the risk of crushing the user's fingers.

Furthermore, in the event that both inner and outer doors 14 and 16 are partially open, the device of the invention again performs the same functions described above. In fact, it can be seen from FIGS. 19 to 25 how the simultaneous opening movement leads the two inner 14 and outer 16 doors to move to the central area of the opening face of the wardrobe 12; the support 30 fixed to the frame 46' which is in turn connected to the outer door 16 intercepts the carriage 22 of the inner door 26 during sliding, so that the wedge-shaped appendage 48 borne by the shaped body 50 of said carriage is engaged in the pincer 44 of said support 30. The two inner 14 and outer 16 doors therefore stabilize each other; at the same time, the stem of the piston 40 of the aforementioned support 30 is pushed by the abutment 56' made on the shaped body 50, creating a cushioned braking effect between said doors. Also in this case, as can be seen in particular from FIGS. 20 and 25, the handles of said doors remain adequately spaced apart from each other, do not collide during their movement and avoid the risk of crushing the user's fingers.

Figure 31:
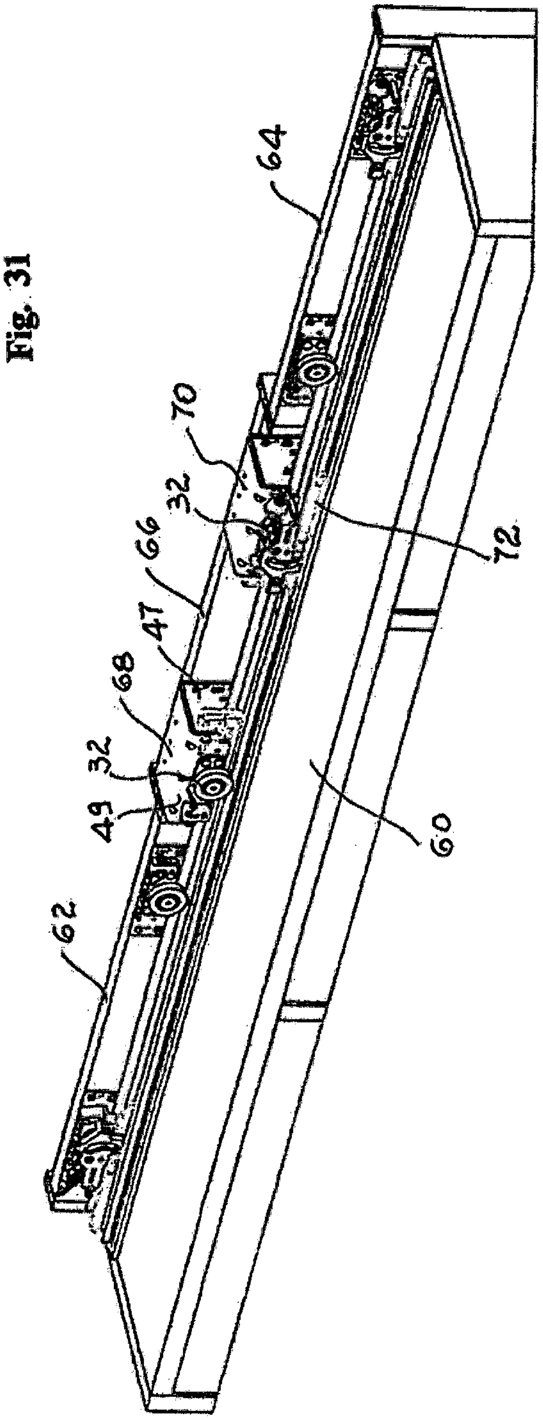
Figure 30:
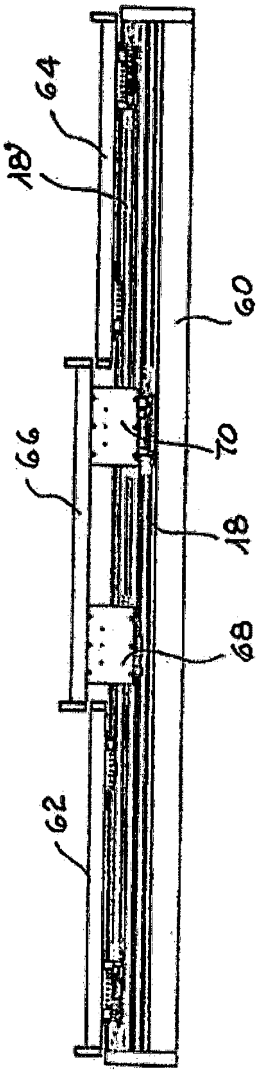
Figures 32, 33, 34:
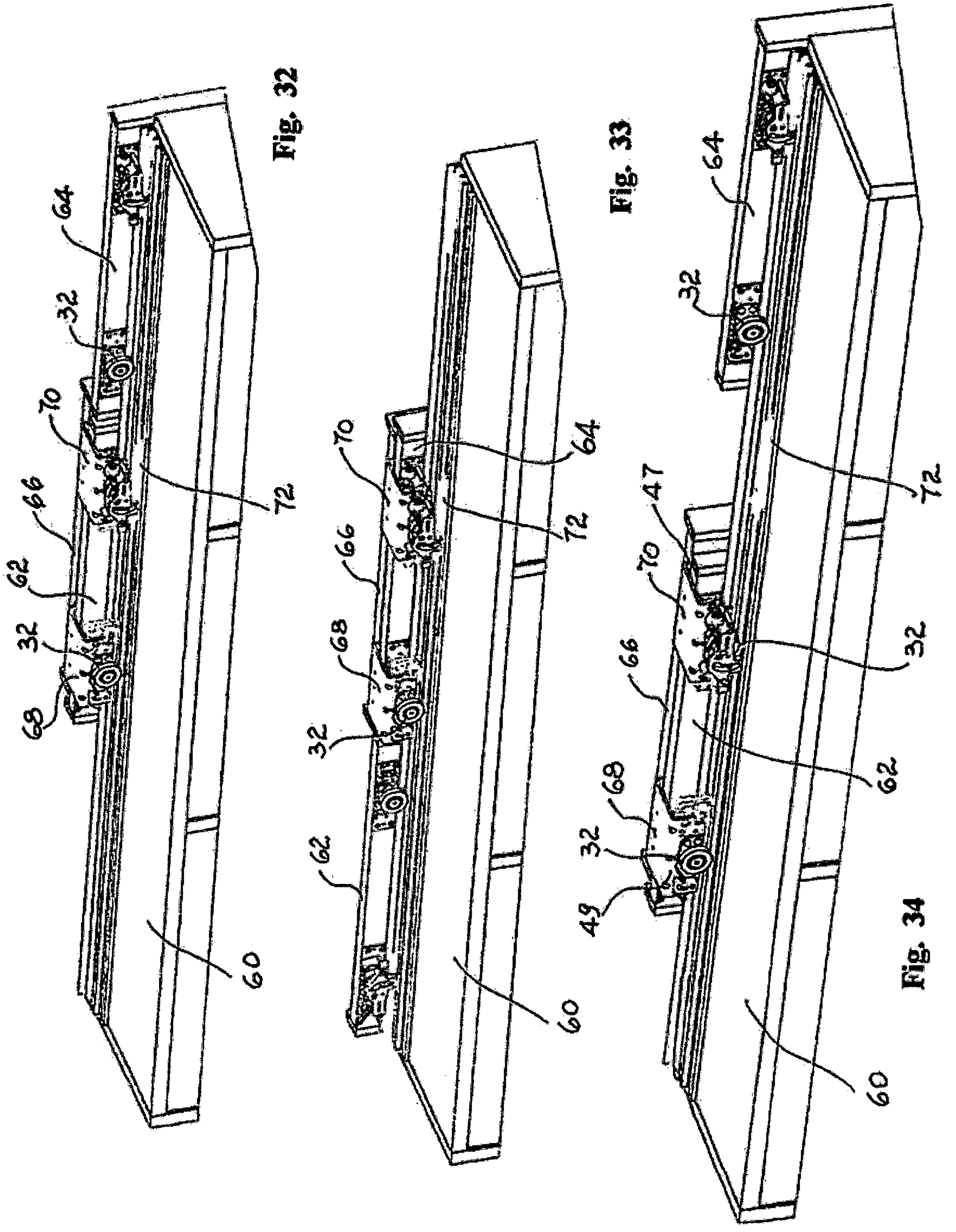

FIGS. 31 to 34 illustrate the solution according to which the handle-saving device of the present invention is applied to a three-door wardrobe. In a wardrobe of this type, two of the doors are aligned with each other and, once closed, present themselves at the opposite ends of said wardrobe; the third door instead projects forward with respect to the others and closes the central part of the wardrobe. Two parallel sliding guides for the respective carriages are then provided on the top or upper base of the wardrobe, similarly to that described above with reference to the shaped profiles 18, 18' of the doors 14 and 16 and as schematically shown in particular in FIG. 30. Said figure, just as the next, illustrates the condition of a wardrobe with three fully closed doors, in which the top or upper base is indicated by reference numeral 60 and the opposite closed side doors are indicated as 62 and 64; the central door projecting outwards in relation to the former is instead indicated as 66. According to this embodiment, referring to a wardrobe provided with three doors arranged in closure as specified above, the projecting central door 66 is provided in the upper part and along the inner face facing the top 60, with two spaced frames with inverted "U" section, indicated as 68 and 70, each of which bears a device 10 with piston 40 and pincer 44. Said device is fixed inside the frame 68, as in the solution in FIG. 23, or outside the frame 70, as in the solution of FIG. 10. An air piston 72 is also provided, along the shaped profile 18 in which the device 10 slides outside the "U" frame 70, similar to the piston 24 in FIG. 2, as well as in FIGS. 3 and 5; consequently, when both inner doors 62 and 64 are closed, as shown in FIGS. 30 and 31, the outer door 66 stops, cushioning its stroke on the piston 72. When the inner door 62 is opened, as shown in FIG. 32, its stroke is stopped and cushioned by the device 10 borne by the frame with inverted "U" section 68, while when the inner door 64 is opened, as shown in FIG. 33, its stroke is stopped and cushioned by the device 10 borne by the frame with inverted "U" section 70. Lastly, in the condition in which both the outer door 66 and one of the inner doors, for example the inner door 62, are both partly open, they stabilize and cushion each other with cushioned braking, similarly to the situation previously described with regard to FIGS. 19 to 25. Also in the solution referring to a three-door wardrobe, consequently, the respective handles remain adequately apart from each other, do not collide during handling and avoid the risk of crushing the user's fingers.

FIGS. 35 to 38 refer to the alternative embodiment, wherein the progressive braking and coupling means provided for the sliding doors of furniture or wardrobes are advantageously used in a device globally denoted by reference numeral 10' in FIG. 35 for a sliding door and are combined with a conventional carriage suitable to support and move said door. From FIGS. 35 and 36 to which reference is now made, it may be noted that, according to this alternative solution, one of the pincers 44 and one of the complementary wedge-shaped appendages 48 of the solution described above and illustrated in particular in FIGS. 28 and 29 are combined with a carriage of a known type, used to support a sliding door (not illustrated). Said carriage, indicated as 80 in FIGS. 35 and 36, typically comprises two pairs of wheels or rollers 82 that allow it to slide within a guide profile, wherein the lower base is provided with a longitudinally extended slot for the passage of a pin 84; said latter projects below the carriage 80 and connects it to the upper edge of the door or wardrobe door by means of a plate 86 connected to said pin. The carriage 80 is provided, on at least one head, with an extension 88 that extends horizontally between a pair of wheels 82 and has two or more holes 90 extending vertically; the holes 90 are arranged to accommodate as many screws 92 which connect to the carriage 80 an upper arm 94, provided at one end with corresponding holes 90'. The screws 92 are inserted from above into the holes 90' of the arm 94. From the opposite end of the arm 94 an integral extension ending in a wedge-shaped appendage 96 extends, similar to the wedge-shaped appendage 48 of the solution previously described, designed to engage between the parallel and elastic arms of a pincer or elastic clamp 98, it too similar to the elastic clamp 44 of the previous embodiment; said elastic clamp is borne by a support 100 that is fixed at or near the end stop of the sliding door. The mouth indicated as 102 in FIG. 35 of the pincer or elastic clamp 98 defines a slotted shape, so as to facilitate the insertion and subsequent retention of the wedge-shaped appendage 96. To said support 100 of the pincer or elastic clamp 98, below said pincer, a piston 104 is fixed, for example of the air type, the stem 106 of which protrudes in the direction facing the carriage 80 and bears at the end an elastomer tip 108. Said piston 104 corresponds substantially to the piston 40 of the solution described above. The tip 108 is abutted by the carriage 80 with its wall opposite the extension 88 provided with holes 90; according to the preferred embodiment of FIG. 35, the arm 94 bearing the wedge-shaped appendage 96 is provided with an integral extension 110, extending downwards and bent back at the end in the direction of the carriage 80. This extension defines, in addition to the screws 92, a stabilizing element of the arm 94, as it engages underneath to the body of the carriage 80; said extension 110 is provided with a window 112, through which the tip 108 of the piston 104 can abut the carriage 80, gradually braking the sliding and accompanying the wedge-shaped appendage 96 of the arm 94 to fit into the pincer or elastic clamp 98.

FIG. 36 illustrates by way of example the arm 94 constrained to the carriage 80 by the screws 92, while FIG. 37 illustrates in exploded view the pincer 98, consisting of two opposite arms or semi-shells 114, 116 connected by rivets 118 or equivalent means. In each of said semi-shells a semi-circular profile seat is made, extending longitudinally, which accommodates and stabilizes a part of the piston body 104; to the outer face of the semi-shells 114 and 116, respective reinforcement plates 114', 116', in metal or other suitable material are preferably fixed. FIG. 38 illustrates, in a view from above, the condition in which the carriage 80 bearing the sliding door is reaching the end stop; the wedge-shaped appendage 96 is about to enter the mouth 102 of the pincer or elastic clamp 98 and the stem 106 of the piston 104 abuts said carriage, braking its stroke gradually. It follows that the sliding door does not violently abut the end stop and, at the same time, is properly stabilized following the insertion of the wedge-shaped appendage 96 into the recess defined by the pincer or elastic clamp 98. The latter is stabilized in the conventional extruded profile in which the carriage 80 slides in a known manner, typically by means of a grub screw 120.

As may be seen from the above, the advantages which the invention achieves are evident.

The device of the present invention allows the doors of a wardrobe to be effectively stabilised in total or partial opening and closure, whether two or three, while simultaneously performing a cushioned and progressive braking thereof. As a result of the advantageous presence of the pincers 44 and the complementary wedge-shaped appendages 48, in addition to said stabilisation of the doors, the precise reciprocal positioning of the same is also obtained, so as to ensure that the respective grips 26 and 28 remain adequately spaced from each other, do not impact and avoid the consequent risk of crushing the user's fingers. According to the alternative embodiment described above, the device of the invention also permits both the cushioned and progressive braking of a sliding door and the stabilization of said door at the end stop.

In the alternative embodiment in FIGS. 35 to 38, the device allows the sliding door not to violently abut the end stop and stabilizes it appropriately following the insertion of the wedge-shaped appendage into the recess defined by the pincer or elastic clamp.

Despite the invention having been described above with particular reference to two of its embodiments, given solely by way of a non-limiting example, numerous modifications and variants will appear evident to a person skilled in the art in the light of the above description. The present invention therefore sets out to embrace all the modifications and variants which fall within the sphere and scope of the following claims.

The invention claimed is:

1. A movement device for sliding movement of at least two doors of a wardrobe or furniture piece of which a first door of the at least two doors is slidably movable along a first guide which is affixed to the wardrobe or furniture piece, the first door being slidably movable along the first guide by a first pair of carriages each of which having one or more first wheels or rollers, the first pair of carriages being fixed to an inner front or near an upper edge of the first door in a spaced-apart arrangement and movably interface with the first guide by the one or more first wheels or rollers; and a second door of the at least two doors being slidably movable along a second guide which is affixed parallel to the first guide, the first and second guides being fixed near a front edge of an upper base of said wardrobe or furniture piece, the second door being slidably movable along the second guide by a second pair of carriages each of which having one or more second wheels or rollers, the second pair of carriages being fixed to an inner front or near an upper edge of the second door in a spaced-apart arrangement and movably interface with the second guide by the one or more second wheels or rollers, the movement device comprising:

a shaped body attached to at least one first carriage of the first pair of carriages; each shaped body including a wedge-shaped appendage extending rightwards or leftwards from the at least one first carriage; and a support member respectively attached to at least one second carriage of the second pair of carriages and configured to house a piston, each support member further including a pincer or elastic clamp which is positioned at a height above the piston, the pincer or elastic clamp arranged to selectively interface with the wedge-shaped appendage of the shaped body.

2. The movement device according to claim 1, wherein said movement device further comprises:

at least two plate-like elements, each of the plate-like elements being configured for direct attachment of one first carriage of the first pair of carriages to said first door, which is an inner door;

at least two frames with an inverted "U" cross-section, each frame being configured for direct attachment of each of the second pair of carriages to the second door, which is an outer door; and opposite first air pistons fixed to an end of the first and second guides and/or on the first and second guides themselves along which the one or more first and second wheels or rollers of the first and second pair of carriages slide, the first air pistons engagingly providing a cushioned stop at an end stroke when selectively closing, opening and in intermediate positions of said inner and outer doors with respect to each other, said support member being fixed to at least one of the at least two frames with the inverted "U" cross-section.

3. The movement device according to claim 2, wherein each of the at least two frames with inverted "U" cross-section define two parallel vertical walls, a first of the two parallel vertical walls configured for attachment to an interior sidewall of the outer door, said at least two frames having a height sufficient to pass over and clear the inner door.

4. The movement device according to claim 3, wherein a second of the two parallel vertical walls of a first of the at least two frames with the inverted "U" cross-section includes an outer surface, on which is attached one or more wheels or rollers combined with a third plate-like element.

5. The movement device according to claim 4, wherein said support member is fixed to an interior sidewall of the second vertical wall of a second of the at least two frames with the inverted "U" cross-section.

6. The movement device according to claim 5, wherein the at least two frames with the inverted "U" cross-section and each shaped, body includes abutments for selective engagement with and actuation of the first air pistons.

7. The movement device according to claim 5, wherein each of the support members is formed of two complementary half-shells, each half-shell including a lower recess with a semi-circular profile extending horizontally to form, when the two complementary half-shells are joined together, a positioning and stabilization seat for a second air piston.

8. A movement device for sliding movement of at least two doors of a wardrobe or furniture piece of which a first door of the at least two doors is slidably movable along a first guide which is affixed to the wardrobe or furniture piece, the first door being slidably movable along the first guide by a first carriage having one or more first wheels or rollers, the first carriage being fixed to an upper edge of the first door and movably interfaces with the first guide by the one or more first wheels or rollers; and a second door of the at least two doors being slidably movable along a second guide which is affixed parallel to the first guide, the first and second guides being fixed near a front edge of an upper base of said wardrobe or furniture piece, the second door being slidably movable along the second guide by a second carriage having one or more second wheels or rollers, the second carriage being fixed to an upper edge of the second door and movably interfaces with the second guide by the one or more second wheels or rollers, the movement device comprising:

an upper arm attached to said first carriage associated with the first door, the first carriage being provided with an extension having two or more holes extending vertically for receiving corresponding fasteners to connect to said first carriage, a first upper arm on which a wedge-shaped appendage extends horizontally; and a support member configured to house a piston and further including a pincer or elastic clamp which is positioned at a height above the piston, the pincer or elastic clamp having to parallel and elastic arms, said support member being arranged such that the pincer or elastic clamp selectively engages with the wedge-shaped appendage on the first carriage.

9. The movement device according to claim 8, wherein said corresponding fasteners are inserted from above into complementary holes of the upper arm.

10. The movement device according to claim 8, wherein said support member is fixed at or near an end stop of the first door, and the piston of the support member includes a stem which protrudes in a direction facing the first carriage.

11. The movement device according to claim 10, wherein the pincer or elastic clamp comprises two opposite arms or semi-shells connected together fasteners, each arm or semi-shell including a semi-circular profile which, when joined together, define a seat which accommodates and stabilizes the piston.

12. The movement device according to claim 8, wherein the upper arm bearing the wedge-shaped appendage is provided with an integral extension which extends downwards to engage the first carriage, wherein the integral extension includes and opening for passage of a tip of the piston.

13. The movement device according to claim 8, wherein said support member is attached to the second carriage associated with the second door, and the piston of the support member of the second carriage includes a stem which extends in a direction so as to selectively engage with the first carriage.

* * * * *